Patented July 11, 1939

2,165,445

UNITED STATES PATENT OFFICE 2,165,445

PREPARATION OF PHENYL METHYL PYRAZYL PHENYL METHYL PYRAZOLONE

Albert B. Boese, Jr., Pittsburgh, Pa., assignor to Carbide and Carbon Chemicals Corporation, a corporation of New York No Drawing. Application August 27, 1936, Serial No. 98,203

10 Claims. (Cl. 260—310)

This invention relates to the production of phenyl methyl pyrazyl phenyl methyl pyrazolone; and it is especially adapted for the preparation of this compound in high yields by reacting phenyl hydrazine or its hydrohalide with dehydracetic acid.

The important features of the process which provides high yields of the desired product involves reacting dehydracetic acid with phenylhydrazine,—preferably in the molar ratio of 1 to 2 or more, respectively,—in solution in a volatile solvent for the reactants which is inert thereto, and in the presence of an organic acid inert toward the reactants and of water moisture. The organic acid preferably is present in amount equivalent to the phenylhydrazine. The presence of the organic acid may be attained, for example, by employing a phenylhydrazine hydrohalide in the presence of an equivalent or other proportion of an alkali metal salt of an organic acid,—or by employing free phenylhydrazine together with an equivalent or other amount of a free organic acid. Thus when sodium acetate is employed, it reacts with the phenylhydrazine hydrochloride to give sodium chloride and phenylhydrazine acetate, the latter of which in turn hydrolyzes to phenylhydrazine and acetic acid. The reaction mixture is definitely acid, though the hydrogen ion concentration thereof is lower than in a case where the sodium acetate or its equivalent is not used.

The reaction is accelerated by heating the reactants, preferably to a temperature at or near the refluxing temperature of the mixture. The crystalline solid which forms in the reaction mixture is removed by filtration, washed with water or its equivalent, and dried, yielding the major portion of the phenyl methyl pyrazyl phenyl methyl pyrazolone. The filtrate is evaporated to near dryness, and the residue is dissolved in dilute caustic alkali solution. This solution is extracted with ether and the mixture permitted to stratify, after which the aqueous layer is neutralized with hydrochloric acid, whereupon the remainder of the said product is precipitated, and may be purified by washing with ether and acetone.

The following equation will illustrate the nature of the reactions involved:

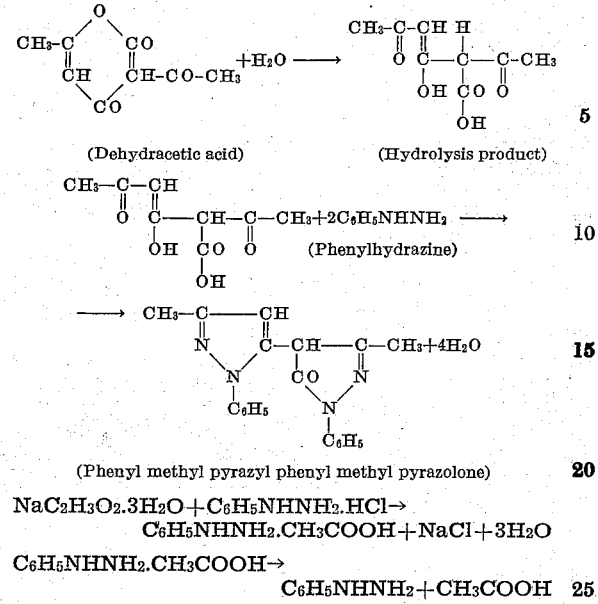

$$NaC_2H_3O_2.3H_2O + C_6H_5NHNH_2.HCl \rightarrow$$
$$C_6H_5NHNH_2.CH_3COOH + NaCl + 3H_2O$$

$$C_6H_5NHNH_2.CH_3COOH \rightarrow$$
$$C_6H_5NHNH_2 + CH_3COOH$$

The ring in dehydracetic acid is opened by hydrolysis involving the addition of one mol of water, followed by condensation of one molecule of the resultant product with two molecules of phenylhydrazine, with the loss of four molecules of water.

The following examples will serve to illustrate the invention:

Example 1

A mixture consisting of 21 grams (⅛ mol) of dehydracetic acid, 36 grams (¼ mol) of phenylhydrazine hydrochloride, and 34 grams (¼ mol) of sodium acetate crystals ($NaC_2H_3O_2.3H_2O$) in 250 cc. of ethanol (95%) was refluxed for four hours, after which the product, a pale yellow crystalline solid, was separated on a filter, washed with water to remove sodium chloride, and air dried. Thus was obtained 32 grams of phenyl methyl pyrazyl phenyl methyl pyrazolone, which melted at 260° C. The alcoholic filtrate was evaporated to dryness, taken up in 200 cc. of 5% aqueous sodium hydroxide solution, and the resulting mixture was extracted with ether to remove any unchanged phenylhydrazine. The ether-extracted aqueous solution was acidified with hydrochloric acid. (In this step the acid may be dilute or concentrated, and other acids such as acetic or sulfuric acid may be used.) A slightly gummy solid precipitated which, after washing with ether and acetone, yielded an additional 7 grams of phenyl methyl pyrazyl phenyl methyl pyrazolone, giving a total yield thereof of 94.4%.

The above is the preferred procedure and gives very satisfactory results. In the absence of the alkali metal salt of an organic acid, the yields secured are much lower, usually less than half as much. In the above example the sodium acetate apparently serves a two-fold purpose. First, it combines with the phenylhydrazine hydrochloride to yield sodium chloride and phenylhydrazine acetate, the latter of which may be regarded as an unstable addition product of phenylhydrazine and acetic acid and which, in solution, is dissociated to phenylhydrazine and acetic acid. Second, the water of crystallization of the sodium acetate assists in the hydrolysis of the dehydracetic acid.

In the reaction the acetic acid formed by interaction of the phenylhydrazine hydrochloride and sodium acetate does not enter into the main reaction but apparently serves to control the hydrogen ion concentration of the reaction mixture. Thus when phenylhydrazine hydrochloride is used in the absence of the sodium acetate, or other salt of a weak organic acid, the hydrogen ion concentration of the mixture is greater than is the case where the latter is present. In the latter case, since the acetic acid is but slightly ionized, the hydrogen ion concentration is relatively low, yet sufficient to maintain the reaction mixture definitely acid to phenolphthalein.

When utilizing a phenylhydrazine hydrohalide as a starting material, other water-soluble compounds of weak organic acids may be substituted for the sodium acetate specifically named supra. Among such compounds may be mentioned the alkali metal salts of such carboxylic acids as maleic, benzoic, lactic, propionic, and tartaric acids. The water-soluble salts of carbonic acid are much less effective in the process than corresponding salts of other weak organic acids; and give distinctly lower yields of the phenyl methyl pyrazyl phenyl methyl pyrazolone than do the latter.

Where phenylhydrazine itself is used as a starting material small amounts of a weak organic acid such as acetic, lactic, benzoic, maleic, propionic or tartaric acid may be added to the reactants in amount, preferably approximately equivalent to the amount of the former used. Carbonic acid is much less effective in the process than other weak organic acids; and much lower yields of the desired product are obtained by its use than by the use of other weak organic acids.

*Example 2*

A suspension of 4 grams of phenylhydrazine hydrochloride, 3.9 grams of sodium acid maleate, and 2.3 grams of dehydracetic acid in 50 cc. of ethanol was heated under reflux for four hours. The solid material was filtered from the reaction mixture, washed with water, and dried, yielding 3.2 grams of the desired product. The alcohol was distilled from the filtrate, and the residue was taken up in a 5% aqueous solution of sodium hydroxide, filtered, extracted with ether and acidified, all in the manner described in Example 1. An additional 0.9 gram of phenyl methyl pyrazyl phenyl methyl pyrazolone thus was obtained,—making a total yield thereof of around 90.7%.

*Example 3*

A suspension of 8 grams of phenylhydrazine hydrochloride, 8 grams of sodium benzoate, and 4.6 grams of dehydracetic acid in 100 cc. of ethanol was heated under reflux for four hours. The reaction mixture was concentrated by evaporation of the ethanol to approximately half its original volume, and the solid material present therein was filtered off. This solid material was washed with ether, then with water, and air-dried. Thus was obtained 8.3 grams of phenyl methyl pyrazyl phenyl methyl pyrazolone, representing a yield of around 91.8%.

*Example 4*

A solution of 8.4 grams (1 mol) of dehydracetic acid and 10.8 grams (2 mols) of phenylhydrazine in 75 cc. of ethanol containing 6 grams (2 mols) of glacial acetic acid was heated under reflux for four hours. The reaction product was treated in the manner described in Example 1. There was secured a yield of 15.2 grams of phenyl methyl pyrazyl phenyl methyl pyrazolone, corresponding to a yield of about 92%.

Other inert solvents for the reactants may be substituted for the ethanol, as for example, methanol, isopropanol, and other lower aliphatic alcohols, and dioxan.

The expression "in the presence of an organic acid" and similar expressions appearing in the claims are used to designate the presence of an organic acid that has been added as such to the mixture of reactants,—or such an acid, the presence of which in the reaction mixture results from the reaction of the water-soluble salt of an organic acid with the hydrogen halide split off from a phenylhydrazine hydrohalide present as a reactant.

It is to be understood that, while the foregoing theory has been advanced in explanation of the reactions which in the practice of the present invention provide such high yields of the desired product,—the invention is not to be construed as limited by such statement of theory, but only as defined in the accompanying claims.

I claim:

1. Process of producing phenyl methyl pyrazyl phenyl methyl pyrazolone, which comprises reacting phenylhydrazine, dehydracetic acid and water, in the presence of an organic acid and of a volatile solvent for the reactants, both the said solvent and organic acid being inert toward dehydracetic acid, the phenylhydrazine and dehydracetic acid being present in the proportion of at least two mols of the former to each mol of the latter, and recovering the phenyl methyl pyrazyl phenyl methyl pyrazolone thus produced.

2. Process of producing phenyl methyl pyrazyl phenyl methyl pyrazolone, which comprises reacting phenylhydrazine, dehydracetic acid and water, in the presence of a volatile solvent for the reactants and of an organic acid, both the said solvent and organic acid being inert toward dehydracetic acid, maintaining the reaction mixture definitely acidic, and recovering from the reaction mixture the phenyl methyl pyrazyl phenyl methyl pyrazolone thus produced.

3. Process of producing phenyl methyl pyrazyl phenyl methyl pyrazolone, which comprises reacting phenylhydrazine, dehydracetic acid and water, in the presence of a volatile solvent for the reactants and of an organic acid, both the said solvent and organic acid being inert toward dehydracetic acid, the phenylhydrazine and said organic acid being formed in the presence of said dehydracetic acid and water by reacting a phenylhydrazine hydrohalide and a water-soluble salt of the said organic acid, the reactants being present in the proportion of at least two mols of the phenylhydrazine hydrohalide and approximately two mols of the said salt to each mol of the dehydracetic acid.

4. Process of producing phenyl methyl pyrazyl phenyl methyl pyrazolone, which comprises reacting phenylhydrazine, dehydracetic acid and water, in the presence of a volatile solvent for the reactants and acetic acid, the said solvent being inert toward dehydracetic acid, the phenylhydrazine and dehydracetic acid being present in the proportion of at least two mols of the former to each mol of the latter, and the acetic acid being present in amount sufficient to maintain the reaction mixture definitely acidic, and recovering the phenyl methyl pyrazyl phenyl methyl pyrazolone thus produced.

5. Process of producing phenyl methyl pyrazyl phenyl methyl pyrazolone, which comprises heating and reacting phenylhydrazine, water and dehydracetic acid, in the presence of a volatile solvent for the reactants and of a carboxylic acid inert toward dehydracetic acid, the said phenylhydrazine and dehydracetic acid being present in the respective proportions of approximately two mols of the former to each mol of the latter, and the carboxylic acid being present in amount approximately the molar equivalent of the phenylhydrazine.

6. Process of producing phenyl methyl pyrazyl phenyl methyl pyrazolone, which comprises forming a mixture with a volatile solvent of a phenylhydrazine hydrohalide, dehydracetic acid, water and a water-soluble salt of an organic acid the said salt being present in amount sufficient to liberate phenylhydrazine from said phenylhydrazine hydrohalide, and heating and reacting the mixture thus produced while maintaining the mixture definitely acid in reaction.

7. Process of producing phenyl methyl pyrazyl phenyl methyl pyrazolone, which comprises intermixing, heating and reacting the components of a mixture in a volatile solvent of a phenylhydrazine hydrohalide, water, dehydracetic acid and a water-soluble salt of an organic acid inert to dehydracetic acid, while maintaining the reaction mixture definitely acidic, the said salt being present in amount sufficient to convert the phenylhydrazine hydrohalide to phenylhydrazine and to liberate from the said salt the free organic acid, the said volatile solvent being inert to the reactants, and recovering the phenyl methyl pyrazyl phenyl methyl pyrazolone thus produced.

8. Process of producing phenyl methyl pyrazyl phenyl methyl pyrazolone, which comprises reacting at an elevated temperature the components of a mixture made by intermixing a phenylhydrazine hydrohalide, water and dehydracetic acid, in a volatile solvent inert to said reactants, in the presence of a carboxylic acid inert to dehydracetic acid and formed in situ, and present in amount approximately the molar equivalent of the phenylhydrazine hydrohalide, while maintaining the reaction mixture definitely acid in reaction.

9. Process of producing phenyl methyl pyrazyl phenyl methyl pyrazolone, which comprises heating and interacting the components of a mixture made by intermixing of a phenylhydrazine hydrohalide, dehydracetic acid, water and a water-soluble salt of a carboxylic acid inert to dehydracetic acid, in the presence of a volatile solvent, the said reactants being present in a molar proportion of approximately two mols of the phenylhydrazine hydrohalide and two mols of the said salt to each mol of the dehydracetic acid, and recovering from the resultant reaction mixture the phenyl methyl pyrazyl phenyl methyl pyrazolone thus produced.

10. Process of producing phenyl methyl pyrazyl phenyl methyl pyrazolone, which comprises heating and reacting a mixture of phenylhydrazine hydrochloride, water, dehydracetic acid and a water-soluble salt of an organic acid inert to dehydracetic acid, in the presence of a volatile solvent inert to the reactants, the said salt being present in amount approximately the equivalent of the phenylhydrazine hydrochloride, and recovering from the resultant reaction mixture the phenyl methyl pyrazyl phenyl methyl pyrazolone thus produced.

ALBERT B. BOESE, Jr.